United States Patent [19]
Lakerdas et al.

[11] Patent Number: 5,925,999
[45] Date of Patent: Jul. 20, 1999

[54] THREE-SPEED DUAL-WINDING DIRECT CURRENT PERMANENT MAGNET MOTOR METHOD AND APPARATUS

[75] Inventors: Andrew Lakerdas; Peter A. Kershaw, both of London; Oliver Stegelmann, Strathroy, all of Canada

[73] Assignee: Siemens Canada Limited, Chatham, Canada

[21] Appl. No.: 08/748,644

[22] Filed: Nov. 13, 1996

[51] Int. Cl.[6] .................................................. H02P 1/32
[52] U.S. Cl. ........................ 318/496; 318/495; 318/498; 388/838
[58] Field of Search ................... 318/494–537; 388/800–841

[56] References Cited

U.S. PATENT DOCUMENTS

| | | | |
|---|---|---|---|
| 2,916,685 | 12/1959 | Genuit | 318/332 |
| 3,063,002 | 11/1962 | Phelon | 318/499 |
| 3,596,161 | 7/1971 | Swanke et al. | 388/827 |
| 3,633,057 | 1/1972 | Smith et al. | 310/184 |
| 3,668,491 | 6/1972 | Kelley et al. | 388/827 |
| 3,678,357 | 7/1972 | Swanke et al. | 318/245 |
| 3,721,875 | 3/1973 | Feldner et al. | 318/245 |
| 3,737,750 | 6/1973 | Kearns | 318/443 |
| 3,943,421 | 3/1976 | Shibata et al. | 318/484 |
| 4,019,106 | 4/1977 | Doren | 318/252 |
| 4,041,360 | 8/1977 | Morris | 318/221 |
| 4,066,937 | 1/1978 | Pfarrer et al. | 318/221 |
| 4,322,665 | 3/1982 | Landgraf | 318/774 |
| 4,454,460 | 6/1984 | Tahara et al. | 318/496 |
| 4,456,751 | 6/1984 | Messelt et al. | 536/91 |
| 4,710,661 | 12/1987 | Gjota | 310/198 |
| 4,755,702 | 7/1988 | Iijima et al. | 310/166 |
| 4,890,049 | 12/1989 | Auinger | 318/771 |
| 4,910,790 | 3/1990 | Kershaw | 388/836 |
| 4,947,072 | 8/1990 | Watkins et al. | 310/179 |
| 4,948,998 | 8/1990 | Fink et al. | 310/127 |
| 5,023,532 | 6/1991 | Gakenholz | 318/541 |
| 5,063,319 | 11/1991 | Mason et al. | 310/210 |
| 5,336,956 | 8/1994 | Haner | 310/179 |
| 5,424,599 | 6/1995 | Stroud | 310/198 |
| 5,455,885 | 10/1995 | Cameron | 388/834 |
| 5,521,471 | 5/1996 | Yang | 318/531 |

FOREIGN PATENT DOCUMENTS

| | | |
|---|---|---|
| 2531286 | 2/1984 | France . |
| 3812190 | 8/1989 | Germany . |

OTHER PUBLICATIONS

Patent Abstracts of Japan (JP 63 023587) vol. 012, No. 232 (E–628) Jan. 1988 Japan.
Patent Abstracts of Japan (JP 60 241760) vol. 010, No. 104 (E–397) Nov. 1985 Japan.

*Primary Examiner*—David Martin

[57] ABSTRACT

A direct current motor having a primary armature winding, a secondary armature winding and a switching circuit adapted to selectively energize the primary winding and the secondary winding to achieve three-speed motor operation is disclosed. The system is adapted to achieve a high speed of the motor by energizing only the primary winding, a medium speed of the motor by energizing only the secondary winding, and a low speed of the motor by energizing both the primary winding and the secondary winding. The system also includes a voltage source providing a direct current level voltage with respect to an electric ground and a switching circuit adapted to operate the motor. The switching circuit is coupled to the voltage supply for energizing the primary winding only to achieve a high speed, energizing only the secondary winding to achieve a medium speed, and energizing both the primary winding and the secondary winding in series with each other to achieve a low speed. A method of operating the motor also disclosed.

22 Claims, 2 Drawing Sheets

5,925,999

THREE-SPEED DUAL-WINDING DIRECT CURRENT PERMANENT MAGNET MOTOR METHOD AND APPARATUS

FIELD OF THE INVENTION

The present invention relates to a method and apparatus for operating a dual-winding direct current motor at three speeds.

BACKGROUND OF THE INVENTION

A conventional direct current (DC) permanent magnet motor, such as is used in the automotive industry, has a single armature winding, which is energized to develop the magnetic field to provide torque to rotate the motor shaft. In a conventional single-winding DC motor, operation at two or more speeds can be achieved by including one or more resistors in the motor circuit. For example, in a two-speed motor circuit, which has a single resistor, when the resistor is bypassed, the motor receives full power (i.e. full current) from the voltage source and operates at full (or high) speed. When current is supplied to the motor through the resistor, the motor no longer receives full power, a portion of the total available power being dissipated in the resistor (as heat), and the motor therefore operates at a reduced (or low) speed. To operate a motor at a third speed (e.g. a further reduced speed) according to this arrangement, another resistor can be included in the motor circuit, and when current is supplied to the motor through the additional resistor or both resistors connected in series, the motor operates at a further reduced speed. Operating a conventional single-winding DC motor of this type at two (or three) speeds motor creates power inefficiencies and heat build-up (in the resistors) that may be undesirable in certain temperature-sensitive applications, such as where the motor is used in a fan for cooling an automotive engine.

As disclosed in U.S. Pat. No. 4,910,790 titled "TWO-SPEED MOTOR," issued on Mar. 20, 1990, DC motors having a dual-armature winding (and two commutators) are also known in the art. In a typical dual-armature DC motor, the primary winding usually has a few coil turns of light gauge wire and the secondary winding usually has several more coil turns with a heavier gauge wire, with both windings being wound onto the same lamination stack, but electrically insulated from one another (e.g. connected to separate commutators). By energizing one winding or the two windings in series, two different motor shaft speeds (high or low) can be achieved. This two-speed motor arrangement does not include the inefficiencies of the conventional two-speed single-winding DC motor (which achieves speed-control at the expense of resistive power losses), as substantially all power supplied to the motor circuit is supplied to the motor windings (and thereby used to produce torque). However, in certain applications it is desirable to have a motor that operates at three different shaft speeds (e.g. low, medium or high).

Accordingly, it would be advantageous to have an arrangement of a dual-winding DC motor with windings that can be energized independently of each other to provide for three different motor shaft speeds. It would be advantageous to have a DC motor with a switching circuit that facilitates operation at three speeds in an energy efficient manner, without undue resistive power losses and resultant heat build-up. It would also be advantageous to have a DC motor with a convenient lead arrangement and speed-matching capability suitable for a wide range of applications. It would further be advantageous to have a method of operating the DC motor that readily allows operation at three (or more) motor shaft speeds.

SUMMARY OF THE INVENTION

The present invention relates to a motor powered by a direct current voltage source comprising a primary armature winding, a secondary armature winding and switching means for selectively energizing the primary winding and the secondary winding to achieve three-speed motor operation. A first speed of the motor is achieved by energizing both the primary winding and the secondary winding, a second speed of the motor is achieved by energizing only the secondary winding, and a third speed of the motor is achieved by energizing only the primary winding.

The present invention also relates to an apparatus for operating a dual-winding direct current motor having a primary armature winding and a secondary armature winding adapted for selective energization by a voltage source providing a direct current level voltage with respect to an electric ground that includes a switching circuit adapted to operate the motor at a high speed by coupling a first lead to the voltage source and a second lead to the electrical ground, a medium speed by coupling the second lead to the voltage source and a third lead to the electrical ground and a low speed by coupling the first lead to the voltage source and the third lead to the electrical ground. The primary winding is energized across the first lead and the second lead and the secondary winding is energized across the second lead and the third lead.

The present invention further relates to an apparatus for operating a dual-winding direct current motor having a primary armature winding and a secondary armature winding at a plurality of speeds including a voltage supply, and switching means coupled to the voltage supply for energizing the primary winding only to achieve a first speed, energizing only the secondary winding to achieve a second speed, and energizing both the primary winding and the secondary winding to achieve a third speed.

DETAILED DESCRIPTION OF THE PREFERRED EMBODIMENTS

Figure 1:
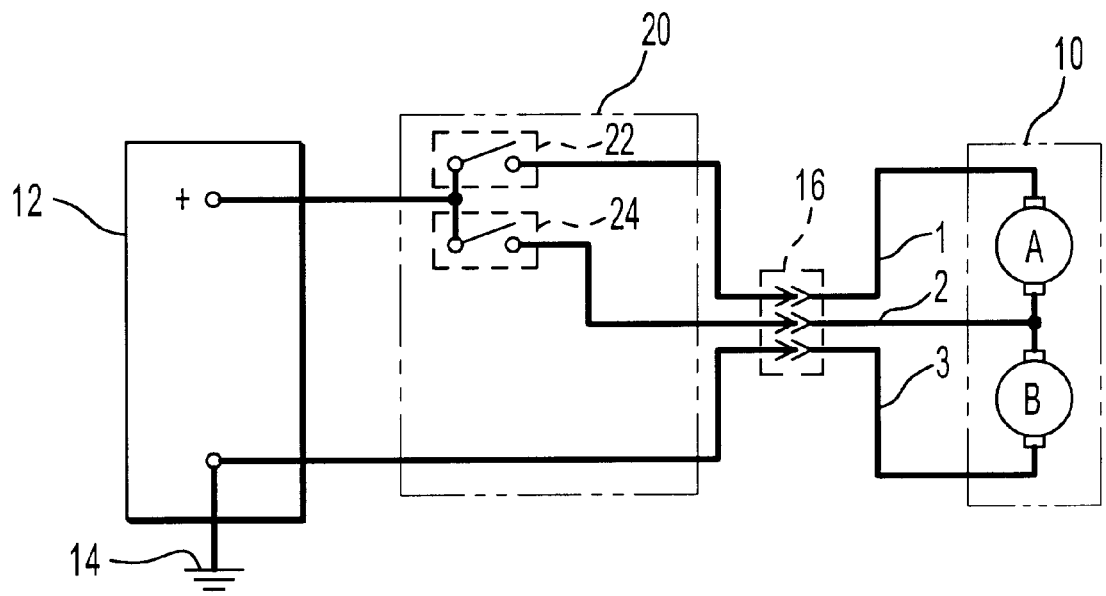
FIG. 1 is a schematic diagram of a dual-winding direct current motor with a corresponding two-speed switching circuit.

Referring to the FIGURES, FIG. 1 shows dual-winding direct current (DC) motor 10 known to the art in an electrical schematic diagram. Motor 10 has a primary winding A and a secondary winding B which are selectively energized to achieve two-speed operation. Primary winding A and secondary winding B are energized by a direct current voltage source 12. In a typical application in the automotive industry the voltage source supplies 12 volts DC with respect to an electrical ground; in other applications the voltage source may supply any voltage suitable to operably energize the motor windings. In a common application, such as in the automotive industry, the voltage source may be a battery.

If the primary and secondary windings A and B have different wire sizes or a different number of coil turns (or some suitable combination thereof), two different motor speeds (high and low) are available, by energizing one winding or both windings (e.g. windings are in series). (As disclosed in U.S. Pat. No. 4,910,790, alternatively, a low speed can be achieved by energizing the secondary winding independently of the primary winding.)

As shown in FIG. 1, motor 10 is coupled to a switching circuit 20 through a connector 16 (shown schematically). Switching circuit 20 facilitates two-speed operation of motor 10 by appropriate energizing of motor windings A and B. Primary winding A is energized across lead 1 and lead 2; secondary winding B is energized across lead 2 and lead 3.

To operate motor 10 at a low speed, lead 1 is electrically coupled to voltage source 12, lead 2 is open (i.e. not electrically coupled) and lead 3 is electrically coupled to an electrical ground 14. In this low-speed configuration, both primary winding A and secondary winding B are energized. To operate motor 10 at a high speed, lead 1 is electrically open, lead 2 is electrically coupled to voltage source 12 and lead 3 is electrically coupled to electrical ground 14. In this high-speed configuration secondary winding B is energized but primary winding A is not energized. Motor 10 is "off" when neither winding is energized. This method of operation for two-speed motor operation is shown in TABLE 1, which is an electrical truth table showing the motor speed as a function of the signal or connection provided at each lead.

TABLE 1

| SPEED | LEAD | | |
|---|---|---|---|
| | 1 | 2 | 3 |
| OFF | OPEN | OPEN | GROUND |
| LOW | +12 V | OPEN | GROUND |
| HIGH | OPEN | +12 V | GROUND |

Switching circuit 20, as shown in an exemplary embodiment in FIG. 1, effects two-speed operation. Switching circuit 20 includes two single-pole single-throw switches 22 and 24 coupled between the voltage source 12 and the motor circuit (through connector 16). Switch 22 switches lead 1 of motor 10 to voltage source 12 (e.g. "on") or to an electrically open state; switch 24 switches lead 2 to voltage source 12 (e.g. "on") or to an electrically open state. (Lead 3 is always coupled to electrical ground 14.) The operation of switching circuit 20 for two-speed motor control is described in TABLE 2.

TABLE 2

| SPEED | SWITCH | |
|---|---|---|
| | SW22 | SW24 |
| OFF | OPEN | OPEN |
| LOW | ON | OPEN |
| HIGH | OPEN | ON |

Figure 2:
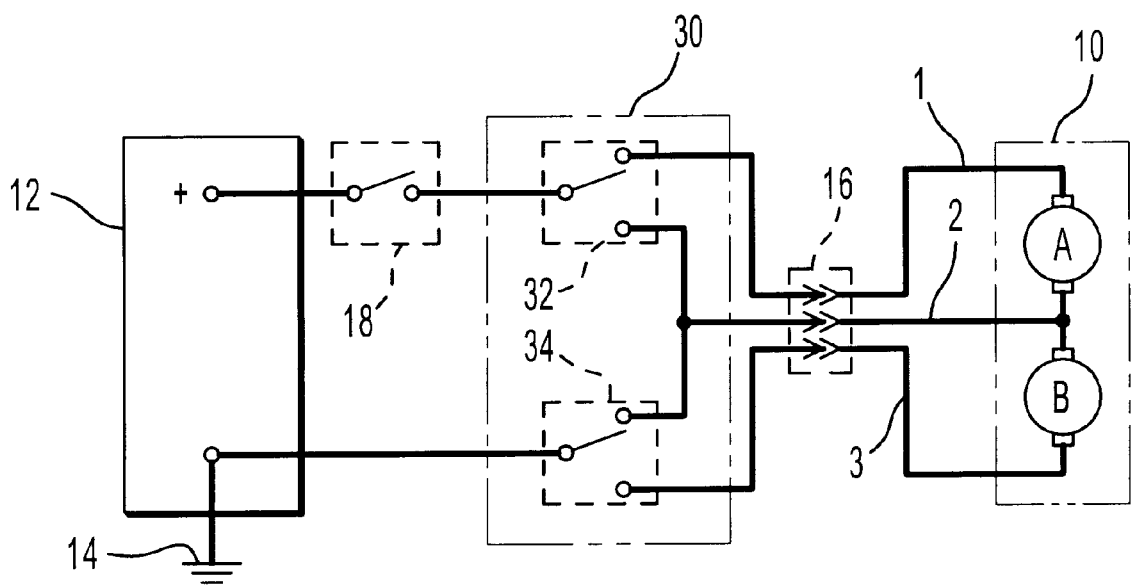
FIG. 2 is a schematic diagram of a dual-winding direct current motor with a corresponding three-speed switching circuit.

Referring to FIG. 2, a preferred embodiment is shown of a dual-winding DC motor 10 adapted for three-speed operation, with a low speed, medium speed and high speed. The primary and secondary windings A and B can be energized either independently or in series. To operate motor 10 at low speed, lead 1 is coupled to voltage source 12, lead 2 is electrically open, and lead 3 is coupled to electrical ground 14 (both primary winding A and secondary winding B are energized). To operate the motor at medium speed, lead 1 is electrically open, lead 2 is coupled to voltage source 12, and lead 3 is coupled to electrical ground 14 (only secondary winding B is energized). To operate the motor at high speed, lead 1 is coupled to voltage source 12, lead 2 is coupled to the electrical ground 14, and lead 3 is electrically open (only primary winding A is energized). This method of operation is shown in TABLE 3.

TABLE 3

| SPEED | LEAD | | |
|---|---|---|---|
| | 1 | 2 | 3 |
| OFF | OPEN | OPEN | GROUND |
| LOW | +12 V | OPEN | GROUND |
| MEDIUM | OPEN | +12 V | GROUND |
| HIGH | +12 V | GROUND | OPEN |

A switching circuit 30 configured to facilitate this method of operation is shown in FIG. 2, according to an embodiment that enables the operation of motor 10 at three speeds. A single-pole single-throw switch 18 functioning as an on-off (master) switch is coupled between voltage source 12 and switching circuit 30. The input pole of switch 18 is electrically coupled to voltage source 12. When switch 18 is electrically open the supply of power to the motor will be interrupted. When switch 18 is closed, connection is made to switching circuit 30 at the input pole of a single-pole double throw switch 32 and will allow the supply of power to the motor. The first output terminal of switch 32 is coupled to lead 1 of the motor and the second output terminal is coupled to lead 2 of the motor. A single-pole double-throw switch 34 is coupled between electrical ground 14 and the motor. The first output terminal of switch 34 is coupled to lead 2 of the motor and the second output terminal of switch 34 is coupled to lead 3 of the motor. This arrangement of switching circuit 30 provides for three-speed motor operation, as is shown in TABLE 4. (In the TABLES "UP" designates the first terminal of a double-throw switch and "DOWN" designates the second terminal; "ON" designates the "closed" state of a single-throw switch and "OFF" designates the "open" state.) Switching circuit 30 can be coupled to the wiring of motor 10 by a connector 16 (shown schematically).

TABLE 4

| SPEED | SWITCH | | |
|---|---|---|---|
| | SW18 | SW32 | SW34 |
| OFF | OPEN | ANY | ANY |
| LOW | ON | UP | DOWN |
| MEDIUM | ON | DOWN | DOWN |
| HIGH | ON | UP | UP |

Figure 3:
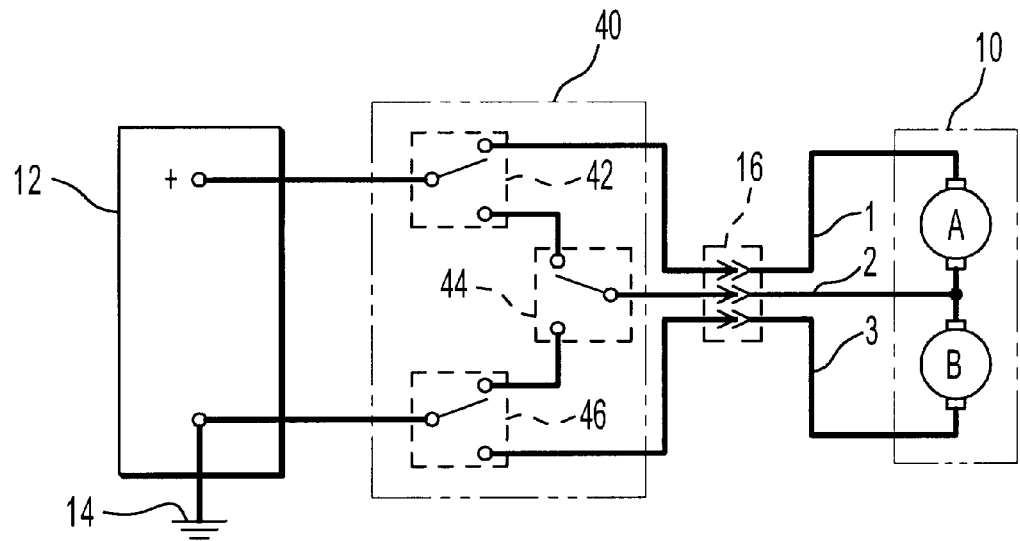
FIG. 3 is a schematic diagram of the dual-winding direct current motor with a corresponding three-speed switching circuit according to an alternative embodiment.

An alternative embodiment of a switching circuit 40 for three-speed motor operation is shown in FIG. 3. Switching circuit 40 includes three single-pole double-throw switches 42, 44 and 46. Switch 42 couples voltage source 12 (at its pole) to either lead 1 of the motor (at the first output terminal) or to the second output terminal of switch 44 (at the second output terminal). Switch 44 couples (at its pole) lead 2 of the motor to either the second output terminal of switch 42 (at the first output terminal) or the first output terminal of switch 46 (at the second output terminal).

Switch 46 couples electrical ground 14 (at its pole) to either the second output terminal of switch 44 or lead 3 of the motor. This arrangement of switching circuit 40 provides a suitable switching function for three-speed operation of motor 10, as is shown in TABLE 5.

TABLE 5

| SPEED | SWITCH | | |
|---|---|---|---|
| | SW42 | SW44 | SW46 |
| OFF | DOWN | DOWN | ANY |
| LOW | UP | ANY | DOWN |
| MEDIUM | DOWN | UP | DOWN |
| HIGH | UP | DOWN | UP |

Figure 4:
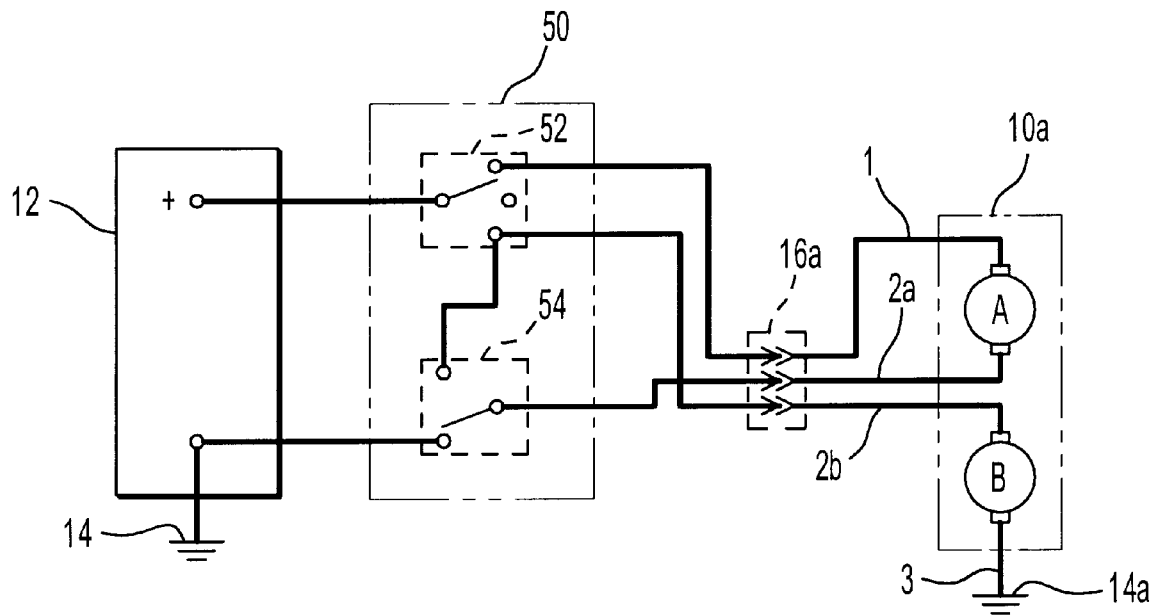
FIG. 4 is a schematic diagram of a dual-winding direct current motor with a corresponding three-speed switching circuit according to an alternative embodiment.

Referring now to FIG. 4, an alternative embodiment of a three-speed dual-winding DC motor 10a is shown (for low speed, medium speed and high speed operation). Motor 10a has a primary winding A and a secondary winding B. Primary winding A is energized across lead 1 and lead 2a. Primary winding A and secondary winding B are not electrically coupled together when originally installed according to this embodiment. Secondary winding B is energized across lead 2b and lead 3. (As indicated, according to this embodiment lead 3 is always coupled to electrical ground 14a during motor operation.) The arrangement of the leads (in comparison to the motor shown in FIGS. 2 and 3) may provide for flexibility in the switching requirements in a given application. Motor 10a is coupled to a switching circuit 50 by connector 16a (shown schematically).

The motor windings are energized in the same basic arrangement as in FIGS. 2 and 3 to achieve three-speed motor operation. To operate motor 10a at low speed, lead 1 is coupled to voltage source 12 and lead 2a is connected to lead 2b. To operate motor 10a at medium speed, lead 1 is electrically open, lead 2a is electrically open, and lead 2b is coupled to voltage source 12 (only winding B is energized). To operate motor 10a at high speed, lead 1 is coupled to voltage source 12, lead 2a is coupled to electrical ground 14, and lead 2b is electrically open (only winding A is energized). (To shut off motor 10a, no voltage is supplied to either winding.)

A switching circuit 50 to facilitate this method of operation according to a preferred embodiment is shown in FIG. 4. Switching circuit 50 includes a single-pole double-throw (center-off) switch 52 coupled from voltage source 12 at a first output terminal to lead 1 at a second output terminal off (i.e. electrically open), or at a third output terminal to lead 2b. Switching circuit 50 also includes a single-pole double-throw switch 54 coupled from lead 2a at a first output terminal to lead 2b or at a second output a terminal to electrical ground 14. This arrangement of switching circuit 50 provides a suitable switching function for three-speed operation of motor 10a, as is shown in TABLE 6.

TABLE 6

| SPEED | SWITCH OR LEAD | | |
|---|---|---|---|
| | SW52 | SW54 | LEAD 3 |
| OFF | MIDDLE | ANY | GROUND |
| LOW | UP | UP | GROUND |
| MEDIUM | DOWN | DOWN | GROUND |
| HIGH | UP | DOWN | GROUND |

It has been observed that a three-speed dual winding motor according to a preferred embodiment of the present invention provides for substantial energy savings at low and medium speeds: At low speed a conventional motor (using resistors for speed-control) may draw approximately 15 amps while the motor according to the present invention may draw approximately 10 amps; at medium speed, the respective approximate current draws are 20 amps and 15 amps. (Both motors may draw 25 amps at high speed.) This energy savings may extend charging system life in an automotive application.

Any preferred embodiment of the present invention may include any known operable DC motor configuration having at least two armature windings. Alternative embodiments can be implemented for motors having more than two armature windings, wherein a greater number of selectable motor speeds may be available according to the principles set forth herein. In the preferred embodiments switches are electromagnetic relays; other types of switches suitable for the voltages and currents of the motor circuit, or even digital logic, can be employed in alternative embodiments. Other switching circuits known to or arranged by one of skill in the art who has reviewed this disclosure may be employed in the practice of the present invention.

It is understood that while the drawings and specific examples describe preferred embodiments of the present invention, they serve the purpose of illustration only. The apparatus and method of the invention is not limited to the precise details and conditions disclosed. For example, any switching circuit capable of effecting the necessary pattern of winding energization can be employed in alternative embodiments. Furthermore, switching circuits employing digital or computer-controlled logic can be used for all or part of the necessary functionality, as is known to those of skill in the art. By adding resistors (appropriately switched and matched) to the motor circuit, a greater number of motor speeds can be achieved in alternative embodiments. Other substitutions, modifications, changes and omissions may be made in the design, operating conditions and arrangement of the preferred embodiments without departing from the spirit of the invention as expressed in the appended claims.

What is claimed is:

1. A motor powered by a direct current voltage source comprising a primary armature winding;

a secondary armature winding; and switching means coupled to the primary winding, the secondary winding and the voltage source for selectively energizing the primary winding and the secondary winding to achieve three-speed motor operation, wherein a first speed of the motor is achieved by energizing both the primary winding and the secondary winding;

a second speed of the motor is achieved by energizing only the secondary winding; and a third speed of the motor is achieved by energizing only the primary winding.

2. The motor of claim 1 wherein the switching means is a switching circuit.

3. The motor of claim 1 wherein the primary winding is energized across a first terminal and a second terminal and the secondary winding is energized across a third terminal and a fourth terminal.

4. The motor of claim 1 wherein the primary winding has a first wire gauge and a first number of coil turns and the secondary winding has a second wire gauge and a second number of coil turns.

5. The motor of claim 4 wherein the first wire size is different than the second wire size.

6. The motor of claim 4 wherein the first number of coil turns is different than the second number of coil turns.

7. The motor of claim 1 wherein the primary winding is selectively electrically coupled in series with the secondary winding.

8. The motor of claim 3 wherein the second terminal of the primary winding and the third terminal of the secondary winding are electrically common.

9. The motor of claim 1 wherein the primary winding and the secondary winding are both wound onto a single lamination stack.

10. The motor of claim 9 further comprising a first commutator electrically connected to the primary winding and a second commutator electrically connected to the secondary winding, the primary winding being electrically insulated from the secondary winding.

11. The motor of claim 3 wherein the switching means is a switching circuit and the first terminal is coupled to a first lead, the second terminal and the third terminal are coupled to a second lead and the fourth terminal is coupled to a third lead.

12. The motor of claim 11 wherein the first lead is selectively coupled by the switching circuit to the voltage source, the second lead is selectively coupled by the switching circuit to the voltage source and the third lead is selectively coupled by the switching circuit to an electrical ground.

13. The motor of claim 3 wherein the first terminal is selectively coupled by the switching circuit to a direct current voltage source, the second terminal is selectively coupled by the switching circuit to the third terminal and the fourth terminal is coupled to an electrical ground.

14. The motor of claim 13 further comprising an on-off switch coupled between the switching circuit and the voltage source.

15. The motor of claim 1, further including a permanent magnet to create a fixed magnetic flux field.

16. An apparatus for operating a dual-winding direct current motor having a primary winding armature and a secondary winding armature adapted for selective energization by a voltage source providing a direct current level voltage with respect to an electric ground which comprises:
   a switching circuit coupled between the motor and the voltage source and adapted to operate the motor at
      a high speed by coupling a first lead to the voltage source and a second lead to the electrical ground,
      a low speed by coupling the first lead to the voltage source and a third lead to the electrical ground and
      a medium speed by coupling the second lead to the voltage source and the third lead to the electrical ground;
   wherein the primary winding is energized across the first lead and the second lead and the secondary winding is energized across the second lead and the third lead.

17. The apparatus of claim 16 wherein the switching circuit comprises:
   a first switch between the voltage source and the first lead and second lead and
   a second switch between the electrical ground and the second lead and third lead.

18. The apparatus of claim 16, further including a permanent magnet to create a fixed magnetic flux field.

19. An apparatus for operating a dual-winding direct current motor having a primary armature winding and a secondary armature winding at a plurality of speeds, which comprises:
   a voltage supply; and
   switching means coupled to the voltage supply for energizing the primary winding only to achieve a high speed, energizing only the secondary winding to achieve a medium speed, and energizing both the primary winding and the secondary winding to achieve a low speed.

20. The apparatus of claim 19 wherein the switching means includes at least one electromechanical relay.

21. A method of operating the motor of claim 15 at a plurality of speeds comprising the steps of:
   (a) achieving a low speed by coupling the first lead to a voltage source, coupling the second lead to the third lead, and coupling the fourth lead to an electrical ground;
   (b) achieving a medium speed by coupling the third lead to the voltage source, maintaining the first lead electrically open, and coupling the fourth lead to the electrical ground; and
   (c) achieving a high speed by coupling the first lead to the voltage source, maintaining the second lead electrically open, coupling the second lead to the voltage source, and coupling the fourth lead to the electrical ground.

22. The apparatus of claim 19, further including a permanent magnet to create a fixed magnetic flux field.

* * * * *